United States Patent [19]
Hoos

[11] 3,981,564
[45] Sept. 21, 1976

[54] LENS SELECTOR

[76] Inventor: Gerald Hoos, 1035 Wesley Ave., Evanston, Ill. 60202

[22] Filed: Oct. 3, 1975

[21] Appl. No.: 619,195

Related U.S. Application Data

[63] Continuation-in-part of Ser. No. 224,642, Feb. 8, 1972, abandoned.

[52] U.S. Cl............................... 350/255; 350/187; 354/222
[51] Int. Cl.² ......................................... G02B 7/02
[58] Field of Search.... 350/178, 187, 226, 245–257; 354/199, 222, 223; 352/93, 94, 142, 139, 170, 171

[56] References Cited
UNITED STATES PATENTS

| | | | |
|---|---|---|---|
| 2,443,390 | 6/1948 | Kingston | 350/187 |
| 2,529,944 | 11/1950 | Houck | 354/222 |
| 2,784,644 | 3/1957 | Bednarz | 350/255 |

*Primary Examiner*—R. V. Rolinec
*Assistant Examiner*—Michael J. Tokar
*Attorney, Agent, or Firm*—Hill, Gross, Simpson, Van Santen, Steadman, Chiara & Simpson

[57] ABSTRACT

Apparatus for selecting the focal length of a camera lens which focal length will provide a desired field size, image size and angle of view. The apparatus has a housing and three lens axially aligned therein: A first lens of the converging meniscus type, a second lens of the plano-convex type, and a third lens system of the biconcave type mounted for axial movement between the first and second lenses. The biconcave lens element is formed of plastic and has a handle means preferably integral therewith which extends through a longitudinal slot in the housing to facilitate such movement. Indicia means adjacent the slot on the housing indicates focal lengths. The third lens system is configured to move within opposed, parallel inside walls of the housing smoothly.

11 Claims, 16 Drawing Figures

LENS SELECTOR

RELATED APPLICATION

This application is a continuation-in-part of my earlier filed U.S. application Ser. No. 224,642 filed Feb. 8, 1972, and now abandoned.

BACKGROUND OF THE INVENTION

Since the 1930's, camera manufacturers have had to provide a viewing device to give the photographer (still and motion picture) a means to view what the camera is seeing as the picture is being taken. When the manufacturers progressed and became more sophisticated in the manufacturing of their camera equipment, both cinema and still, especially the small, hand held 35 mm cameras, they added the ability to interchange lenses, thereby changing a given camera's effective focal length over a range extending from telephoto to wide angle. When they added this feature, they had to give the photographer a means to view what each lens was seeing and registering on the film.

To do this, some manufacturers developed rather sophisticated zoom lens systems that acted as the viewer for the camera. Other manufacturers developed viewing devices that were associated with their camera that would give the maximum angle of view for the widest angle lens they offered for an individual camera, and they put small scribed lines on the viewing aperture indicating the respective views encompassed by their other lenses for that camera. In the mid 1950's, manufacturers began merchandising single lens reflex viewing systems wherein the actual image the eye is seeing is being projected to the eye through the use of a system of prisms and/or mirrors, and the image is what the lens itself is actually viewing.

Viewing devices, however, remain in common use, particularly for cameras of the non-reflex type. When a lens is changed, one dials or otherwise sets a given viewing device to cause same to see what the viewing lens sees. Usually, the device has no intermediate markings or intermediate positions between those showing focal lengths of the lenses available for a particular camera only, click stops being customary. Furthermore, many of these devices utilize from four to seven lens elements, and apparently all employ complex lens movement and/or focusing means. There was no viewing device which would allow one to continuously alter focal length or to hold any desired particular focal length. So far as is known, there has not previously been available a simple, three lens instrument which would enable a photographer, or someone advising a photographer, to see and determine for himself what portion of a given general scene is to be photographed with a given lens, or what lens to use to photograph a desired portion of such a given general scene.

An object in photography is to end up with a picture composed of desired subject matter. In photographing a particular scene, this composition is obtained by selecting a lens having a focal length such that the desired field of view for such composition is obtained. While it is possible in a single lens reflex camera to have a built-in view finder that allows through the lens viewing of the exact scene which will be photographed, it will be understood and appreciated that, where the photographer has a large number of lenses from which to choose, the selection of an individual lens will be extremely time consuming, inconvenient, and, commonly, inaccurate. The most reliable procedure involves attaching a particular lens to the camera body, focusing on the desired scene, detaching that lens, and replacing that with another, etc., and then finally comparing and selecting from among the various views the lens providing the best view that he will have observed. There is a very real need among photographers for very simple, inexpensive, easily carried instrument which will allow them to preselect a particular lens focal length for a given subject using their camera, such that the picture to be taken may be easily and reliably composed or "framed."

SUMMARY OF THE INVENTION

My invention concerns a simple, inexpensive, readily carried instrument which allows a photographer to preselect for his camera a particular lens having a focal length that will properly frame a desired picture. This instrument comprises an elongated housing member having a converging meniscus lens fixed therein adjacent a first end thereof, a plano-convex lens fixed therein at an opposite (second) end thereof, and a longitudinally movably mounted (relative to such housing) biconcave lens system therebetween. By use of this instrument, the focal length of a lens through which a particular field of view may be seen is quickly and conveniently determined. The lenses are axially aligned with their focal planes in generally spaced, parallel relationship so that the user may peer through such first end of the housing and see an image which is variable by means of sliding movement of the biconcave lens system. The biconcave lens system has a laterally extending projection or handle means associated therewith to facilitate movement thereof. This handle means may be integrally formed with a biconcave lens system and extends through a longitudinal slot in the housing. A biconcave lens is formed of plastic. Indicia may be and preferably are provided along the longitudinal slot to indicate the focal length selected.

The interior opposed surfaces of the housing member may be, and preferably are, in, spaced, generally parallel relationship to one another. The biconcave lens system has its thickened outer edges precisely contoured to fit movably within the inner configuration of the housing. This construction allows the biconcave lens system to maintain a generally parallel focal plane relationship relative to the other two lenses and yet move easily and smoothly between the two.

It is contemplated that the instrument is preferably made entirely of lightweight material, such as plastic, and is of a size easily affixed to a camera or held by one hand of the user. Such a small "vest pocket" size greatly facilitates carrying.

The handle of the biconcave lens system may be resiliently biased against portions of the housing adjacent the slot therein. Detents can appear along one side of the seat. The handle can indicate predetermined focal lengths sighted through the instrument. Movement of the biconcave lens system uniformly between predetermined opposed, longitudinally spaced end positions relative to the housing is preferred. In one preferred embodiment, the housing is rectangular in cross section, and the individual lenses thereof have appropriate conforming rectangular configurations. Where a particular camera may have a particular construction which produces a field of view with particular rectangular proportions, a calibrated mask may be fitted over the second end of an instrument so that the field of view through such instrument will correspond to that of such camera.

Other aims, purposes, objects, features and advantages of the present invention will be readily apparent from the following description of certain preferred embodiments thereof, taken in conjunction with the accompanying drawings, although variations and modifications may be effected without departing from the spirit and scope of the present invention.

DESCRIPTION OF THE PREFERRED EMBODIMENTS

Figures 1, 2, 3, 4, 5:
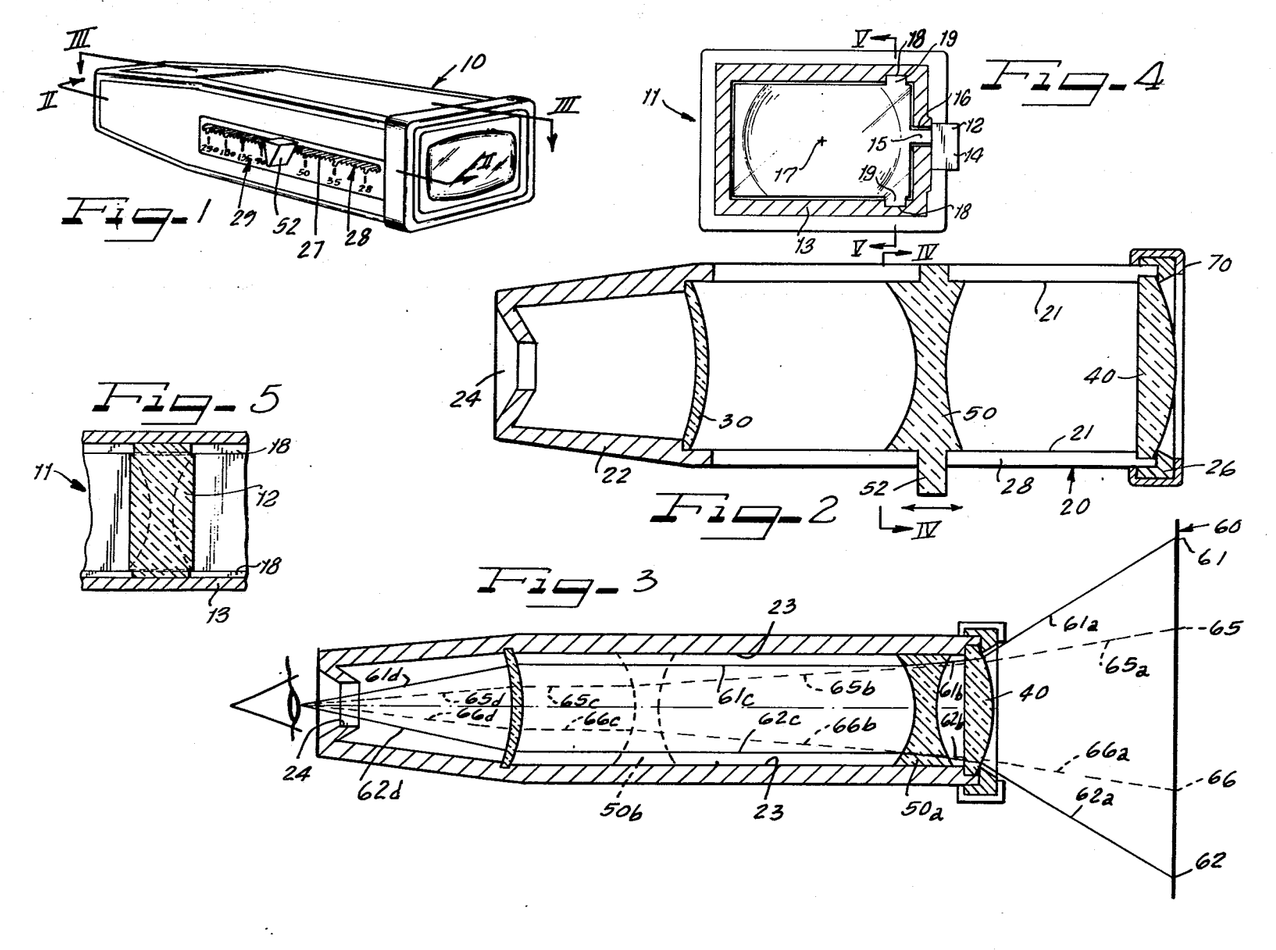
FIG. 1 is a perspective view of an embodiment of a lens selector of the present invention.
FIG. 2 is a longitudinal sectional view taken along the lines II—II of FIG. 1.
FIG. 3 is a schematic longitudinal sectional view taken along the lines III—III of FIG. 1 and illustrating schematic lines of sight for several positions of the bioconcave lens.
FIG. 4 is a transverse sectional view taken along the lines IV—IV of FIG. 2 showing an alternative of a bioconcave lens system adapted for use in the lens selector of FIGS. 1 through 3.
FIG. 5 is a fragmentary longitudinal sectional view taken along the lines V—V of FIG. 4.

Referring to FIGS. 1–3, there is seen a perspective view of a lens selector 10 according to this invention illustrating a sturdy, pleasing, compact, easily operable construction. The lens selector 10 is seen to comprise a generally tubular but cross-sectionally rectangular housing generally indicated by the numeral 20 and having a first end portion 22. End portion 22 may be constricted or tapered towards a first end opening 24 in such first end portion 22. End portion 22 with opening 24 serves as an eye piece through which a user can sight through the lens selector 10, as shown in FIG. 3. A first lens 30, which is of the converging meniscus type, is fixed in the housing 20 adjacent the end portion 22. Lens 30 is axially aligned with a second lens 40 which is fixed at the opposed or second end 26 of the housing 20. Lens 40 is of the plano convex type. Between the first lens 30 and the second lens 40, there is movably mounted a third lens or biconcave lens system 50 which is axially aligned with the lenses 30 and 40 and which is axially movable between the first and the second lenses 30 and 40, respectively.

A handle means 52 which is integrally formed with the third lens 50, and is in the nature of a square stud, extends through a longitudinal slot 28 which is formed in housing 20. Handle means 50 protrudes outwardly of the housing 20 past slot 28 whereby it may be readily grasped by the hand of an operator to move the lens third 50. A second square stud 51 located in opposed relationship to handle means 52 and likewise integrally formed with third lens 50 extends through a second longitudinal slot 21 which is formed in housing 20 and which is in opposed, parallel relationship to slot 28. Stud 51 and handle means 52 can be grasped together between the fingers to move a third lens 50. As shown in FIG. 1, the longitudinal slot 28 may have adjacent thereto on the outside face of housing 20 suitable indicia generally indicated by the numeral 29 therealong (see FIG. 1), and the handle 52 may be suitably shaped in a V-shape, as shown for example, in FIG. 1, so that the head or point thereof permits an operator to readily and accurately read the indicated calibrated focal length shown once a view is selected. As may be clearly seen in FIG. 1, the slot 28 may have suitable detents, teeth or serrations formed in one side therein which may cooperate with the handle means 52 to indicate predetermined focal lengths whereby movement of the third lens 50 can be controlled in selecting a particular focal length. The handle means 52 may in such an embodiment even have a resilient bias urging it into contact with such serrations or detents so that third lens 50 will stay in a chosen position.

As illustrated, a lens selector 10 typically has a cross sectionally rectangular configuration with the first, the second and the third lenses 30, 40 and 50, respectively, each having generally conforming rectangular configurations. The portion of the housing 20 between the first lens 30 and the second lens 40 has parallel opposite inside surfaces. With this construction, the third lens 50 has its outer edges configured to fit precisely within the inner configuration of the housing as defined by such inside surfaces so that the third lens 50 not only can move smoothly therein, but also can at the same time maintain a constant axial relationship with the first and second lenses 30 and 40, respectively. The relationship between these lenses is one of generally parallel focal planes so that the image moving through the second lens 40, the third lens 50, and the first lens 30, respectively, to the eye piece opening 24, remains true and free of distortion generally independently of the position of third lens 50 in housing 20.

As shown in FIGS. 2 and 3, generally the first lens 30 is characteristically a converging meniscus lens, the second lens 40 is characteristically a plano-convex lens, and the third movable lens 50 is a characteristically biconcave lens system. With this arrangement, as can be seen in the schematic illustration of FIG. 3, when the third lens 50 is in the position shown in solid lines at 50a, corresponding for example, at a focal length of 28 millimeters, the portion of an image schematically illustrated at 60 seen through the opening 24 by the schematically illustrated eye of the user will include a wide angle ranging from point 61 through point 62. The outer lines of sight shown by solid lines 61a and 62a extend from the points 61 and 62 to the lens 40. Each converges after passing through the plano convex lens 40, as shown by lines 61b and assume a generally parallel relationship relative to each other, as shown by lines 61c and 62c, after passing through the third biconcave lens 50 which is in the position 50a. Finally, as shown by the lines 61d and 62d, such outer lines of sight converge to meet at a focal point at the eye of the user.

When the third lens 50 is in the position 50b indicated by the dotted lines the portion of the object 60 as seen by the eye of the user extends through a narrower range as schematically illustrated, for example, from the point 65 to the point 66. Thus, as shown in dotted lines, the outer lines of sight 65a and 66a pass from the image 65–66, travel through the second lens 40 from where they converge, as shown by the lines 65b and 66b, to the biconcave lens 50b from which they pass generally parallelly relative to each other, as indicated by the dotted lines 65c and 66c to the convergent first lens 30 from which they pass in a converging manner, as indicated by the dotted lines 65d, and 66d, through the opening 24 to a focal point at the eye of the user. In the latter instance, the focal length in this example is approximately 135 millimeters using a 35 mm still camera format and camera lens system; in the former instance, such focal length is about 21 mm.

From the above description, it can be seen that, as the third lens 50 is moved from a position generally indicated at 50a to a position generally indicated at 50b, the amount of an image 60 which may be seen by the viewer decreases in the one dimension illustrated from the outer points 61, 62 to a size between the points 65 and 66. It will be understood that a similar reduction will occur in a second dimension perpendicular to the plane of the drawing. Hence, the area of the image seen will be greatly reduced as such movement of lens 50 occurs. As shown, the instrument 10 has a range from a short 28 millimeter focal length, usually referred to as "wide angle", to a very long 250 millimeter focal length usually referred to as "telephoto" as measured when using a 35 mm still camera format and lens system. It will be understood, however, that the particular ranges in focal lengths to be varied to suit desired conditions of practice and available camera focal lengths and lens types. Preferred lens selectors of this invention have combinations of first, second and third lenses which will provide an instrument range of at least about 10:1 focal length from telephoto to wide angle positions of the third (bioconcave) lens system.

In FIGS. 4 and 5, there is seen illustrated an alternative construction for a bioconcave lens system suitable for use in a lens selector 11 (which is similar to lens selector 10) which lens system is herein designated in its entirety by the numeral 12. Lens system 12 is adapted to be mounted in a housing 13. The lens system 12 is an integral, one-piece, molded, clear, plastic construction, except for a handle member 14 which is separately conveniently also molded of plastic. Lens system 12 includes a central portion with concave lenticular opposed faces formed therein, and lens system 12 has an integrally formed shoulder 15 which is adapted to project from a side edge thereof through an appropriately formed longitudinally extending slot 16 formed in the housing 13 in the assembled lens selector 11, analogously to the slot 28 in the housing 20. The shoulder 15 projects through the slot 16 and extends outwardly beyond the housing 13 so that, in the assembled lens selector 11, the handle member 14 can be mounted upon and over the terminal end portion of the shoulder 15. The shoulder 15 is preferably formed with cross sectionally rectangular wall portions suitably dimensioned to aid in orienting and maintaining the lens system 12 positioned in housing 13 with its axis extending parallelly and coincidentally with the axis 17 of the housing 13.

Housing 13, like other housings employed for lens selectors of this invention, has two pairs of generally parallelly extending opposed inside wall faces in the region where lens system 12 slides. On the pair of walls adjacent that side of housing 13 in which slot 16 is formed, a pair of channels 18 are here provided, one channel being formed on the inside face of each such opposed wall member. Mating rail portions 19 are integrally formed on edge portions of the lens system 12 so that, when the lens system 12 is mounted in the housing 13, the rails 19 are adapted to engage and ride in the channels 18 as the lens system 12 is slidably moved longitudinally in the housing 13 in response to manual pressures applied to the handle member 14. The type of relationship shown in FIG. 4, where the rails on the lens 12 are positioned upon opposite sides thereof adjacent the one side thereof wherein is formed the shoulder 15, represents a preferred arrangement in order to minimize any tendency for the lens system 12 to exhibit a sort of cocking or twisting action relative to axis 17 during sliding motion thereof within the housing 13.

Except for the channels 18 and single slot 16, the housing 13 can be regarded as being constructed similarly to the housing 20 of the lens selector 10, and as being comprised to a one-piece, molded, plastic material, except for a cap member which can be identical to the type of snap-on cap 26 employed in lens selector 10.

In assembly, it is convenient to first mount a first lens 30 in housing 13, using an adhesive or the like, and then to slidably engage the lens 13 with housing 13 (since the slots 15 and channels 17 extend to the end of housing 13), and then finally to mount a second lens 40 in the housing 13. Thereafter, one mounts such an end cap over the end portions of housing 13 in the manner shown, for example, in FIGS. 2 and 3 for the lens selector 10.

Referring to FIGS. 6 through 9, there is seen another embodiment of a lens selector of this invention, herein designated in its entirety by the numeral 32, which employs a first lens 33, a second lens 34, and a third lens system 35, each of whose respective lenticular surface portions are constructed with characteristic curvatures as indicated above for the first lens 30, the second lens 40, and the third lens 50 of the lens selector 10, as those skilled in the art will appreciate. Lens 35 is formed of clear plastic, while lenses 33 and 34 can be formed of glass, but are preferably formed of clear plastic. Housing 36 of lens selector 36 is formed in two pieces or lengthwise halves not separately here detailed, but which are interengaged together along positions of jointure by means of an adhesive (such as a bonding glue, sonic welding, or the like). These lenses 33, 34 and 35 are mounted at their perimeter positions in channels molded into the inside walls of housing 36 before the housing 36 is assembled into one entity.

The third lens system 35 is configured generally in a manner similar to that employed for the third lens system 50 of the lens selector 10. Here, a pair of opposed shoulders 37, which are each formed integrally on outer edges of the lenticular surfaces of the third lens 35, are adapted to matingly engage a pair of channels formed in housing 36, one shoulder 37 in each channel 38. The outer edge of each shoulder 37 has serrations formed therein for gripping between the fingers of a user. An indicator 39 is provided on one or both shoulders 37 (see FIG. 8) as a means for locating third lens 35 relative to focal length calibrations 39 marked on the housing 36 surfaces adjacent slot 45, so as to permit the user to read directly a particular focal length determined by lens selector 32.

Figure 6:
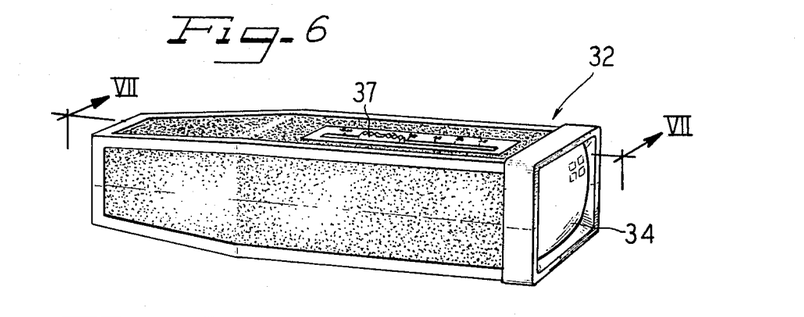
FIG. 6 is a perspective view of an alternative embodiment of a lens selector of the present invention.
Figure 7:
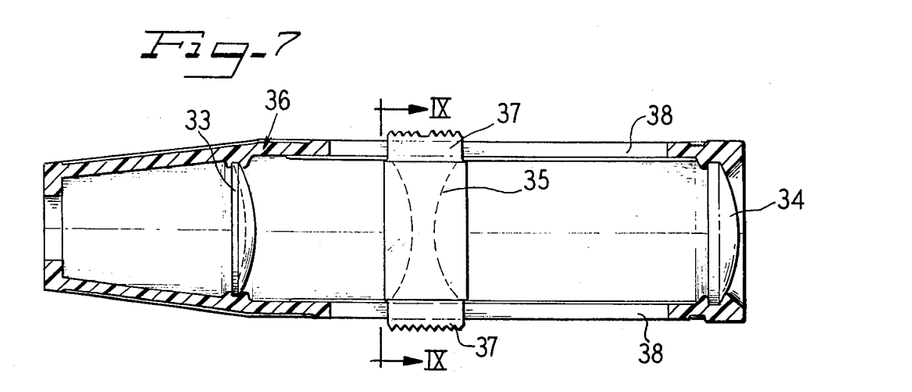
FIG. 7 is a schematic cross-sectional longitudinal view taken along the lines VII—VII of FIG. 6.
Figure 8:
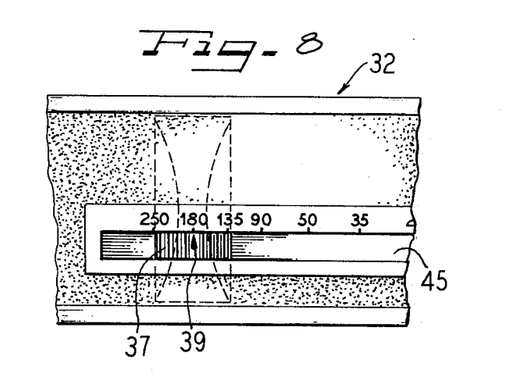
FIG. 8 is a fragmentary enlarged detail top plan view of a side of the lens selector shown in FIGS. 6 and 7.
Figure 9:
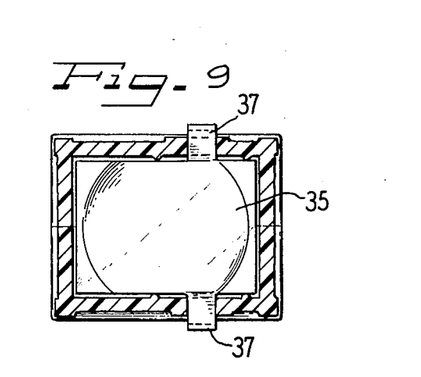
FIG. 9 is a transverse sectional view taken along the line IX—IX of FIG. 7.

Outside wall portions of the housing 36 can be molded to simulate a material, such as leather or the like. The shoulders 37 of third lens 35 are offset to one side, but are in opposed relationship to one another, and are located near the adjoining side therebetween of the lens 35. Such an offset not only aids the user from the stand-point of easy grasping and sliding, but also can permit an optimized type of suitable control of third lens cocking. Further, such an offset permits the marking on side surface portions of the housing 36 adjacent slots 38 of a plurality of different, but longitudinally adjacently located, numerical scales so that a given lens selector 32 can be employed with a plurality of different lens systems, camera types, and film formats. Thus, it is possible for one lens selector 32 to be employable for the selection of virtually any focal length lens with a film format ranging from, for example, 16 mm up through 8 by 10 inches, as those skilled in the art will appreciate.

Figure 10:
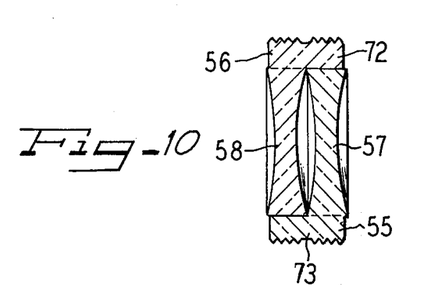
FIG. 10 is a transverse sectional view of an alternative embodiment of a biconcave lens system adapted for use in the lens selector of FIGS. 6–9.

While, as those skilled in the art will appreciate, it is preferred to construct the third lens 35 so as to have a single pair of opposed concave lenticular surfaces formed in one piece of clear plastic so that such surfaces have a common center and equal radii of curvature, it is possible to employ as a third lens system 35 a pair of biconcave lens which are placed together in a coaxial relationship as illustrated by the third lens embodiment shown, for example, in FIG. 10.

The biconcave lens system shown in FIG. 10 is designated in its entirety by the numeral 54. Lens system 54 is comprised of two clear molded plastic components, one component being designated 55 and the other 56. Each component 55 and 56 incorporates a biconcave lens element 57 and 58, respectively. Each element 57 and 58 is substantially identical to the other thereof in optical properties and characteristics, and each element 57 and 58 is characterized by having respective radii of curvature on its individual opposed faces which are less than the respective radii of curvature associated with a single biconcave lens element, such as is employed, for example, in the third lens system 35 of lens selector 32. By employing two such lens elements 57 and 58 in coaxial adjacent relationship to one another in the manner shown generally in FIG. 10, improved optical properties are obtained, especially as respects color, as those skilled in the art will appreciate.

In lens system 54, each component 55 and 56 has an integral, edge-protruding shoulder portion 72 and 73, respectively. The shoulder portions 72 and 73 are so formed that the individual components 55 and 56 slidably interconnect and engage with one another so with each shoulder of lens element 58 engage an edge portion of the adjacent lens element 57 or 58, as the case may be. The abutting portions may be adhered together with an adhesive or the like so as to provide a unitary lens system 54. In addition, since the shoulder portions 72 and 73 extend outwardly in opposed relationship to one another, they are adapted to ride one in each of the channels 45 of the housing 36 of lens selector 32. Outermost edge portions of shoulders 72 and 73 can be provided with serrations, as shown, for easy grasping between finger tips in an assembled lens selector, such as lens selector 32.

Figure 11:
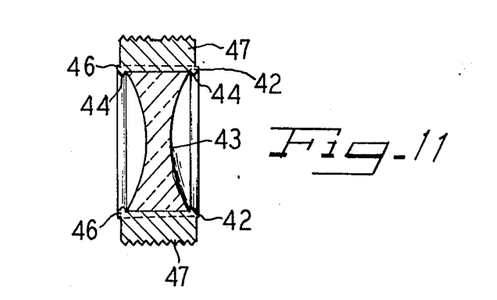
FIG. 11 is a transverse sectional view of a further alternative embodiment of a biconcave lens system adapted for use in the lens selector of FIGS. 6–9.

A biconcave lens system suitable for use in a lens selector of this invention can include a biconcave lens element of molded clear plastic, such as element 43 in FIG. 11. Then, a pair of tabs 47 can be secured to element 43 to produce a completed biconcave lens system. Each of the tabs 42 have clips 4b for securing such to element 43. Each tab 42 has an upstanding shoulder 47 which is shaped to slidably engage the slot 45 (see FIG. 8) in the lens selector 32. The shape of the shoulders 47 is such that they serve to position and hold the element 43 relative to the housing 36 and permit element 43 to be slidably moved longitudinally within the housing 36 between the first lens 33 and the second lens 34. In addition, each shoulder 47 terminates in knurled portions for finger gripping.

Figure 12:
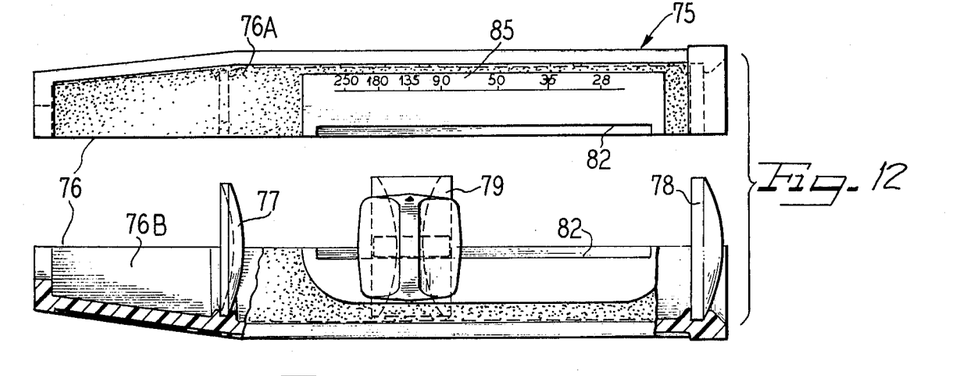
FIG. 12 is a plan view, partially exploded, with some parts thereof broken away and some parts thereof shown in section, of a further alternative embodiment of a lens selector of the present invention.
Figure 13:
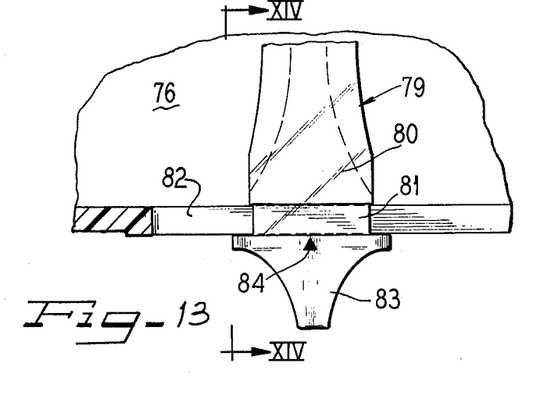
FIG. 13 is a fragmentary enlarged view in longitudinal section in the region of the biconcave lens system of the lens selector of FIG. 12.
Figure 14:
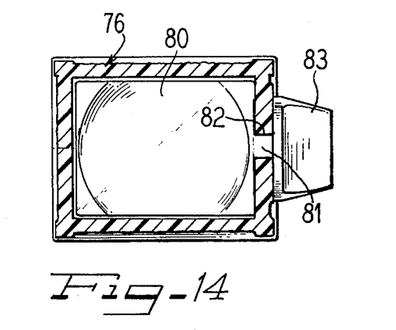
FIG. 14 is a complete transverse sectional view taken approximately along the lines XIV—XIV of FIG. 13.

Referring to FIGS. 12, 13 and 14, there is seen an additional embodiment of a lens selector of this invention which is herein designated in its entirety by the numeral 75. Lens selector 75 employs a housing 76 formed of mating halves, designated as 76A and 76B, respectively, the relationship between the halves 76A and 76B being such that, in an assembled lens selector 75, abutting edges thereof may be sealed together by sonic welding, an adhesive, or the like, the halves 76A and 76B each being formed of an opaque, molded plastic. The lens selector 75 is provided with a first lens 77, a second lens 78 and a third lens 79 each having a character as earlier described.

The third lens system 79 is here formed of a single piece of clear molded plastic. Thus, the third lens 79 includes a biconcave lens element 80 which has protruding therefrom a single shoulder 81 which upstands both across one edge of lens element 80 parallelly with respect to the axis (not shown) of the lens element 80, and radially outwardly with respect to such axis. The shoulder 81 is adapted to be received within a channel 82 defined in the assembled housing 76 of selector 75. The radially outer edge of shoulder 81 is directly interconnected with an integrally formed enlarged handle or knob 83.

The radial height of shoulder 81 is only slightly greater than the depth of channel 82. Preferably the longitudinal ends of shoulder 81 are slightly inset from extreme edges of the lens element 80. When the third lens or biconcave lens system 79 is positioned in the housing 76, the edges of the lens element 80 coact with the shoulder 81 and the knob 83 to provide an assembly suited for slidable movements in and along the channel 82 in the housing 76 of selector 75 with substantially no tendency of for the lens system 79 to demonstrate checking action, or cocking action. The lateral side edge of knob 83 is provided with a slightly raised pointer 84 thereby permitting the read-out of focal length on a suitable scale 85 callibrated and marked on one surface of the housing 76 adjacent to the channel 83 therein.

Figure 15:
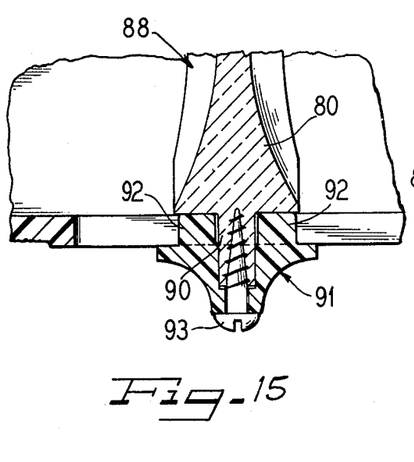
FIG. 15 is a view similar to FIG. 13 but showing an alternative embodiment of a biconcave lens system adapted for use in the lens selector of FIGS. 12 through 14, such biconcave lens thereof being shown in longitudinal section.
Figure 16:
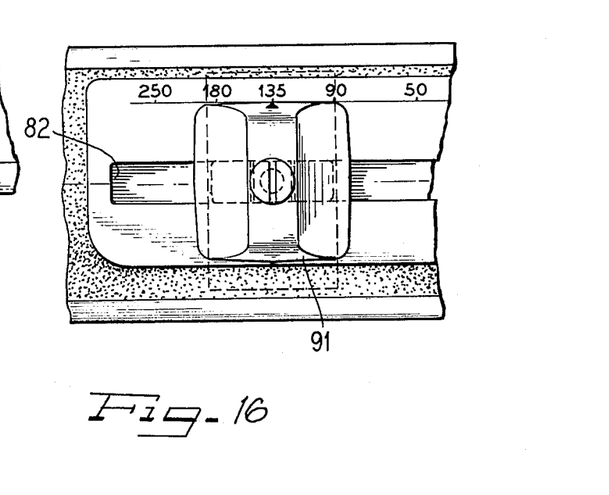
FIG. 16 is a fragmentary, enlarged, detail top plan view of a side of the lens selector of FIGS. 12 through 14 but employing the alternative biconcave lens system embodiment of FIG. 15.

In FIGS. 15 and 16, there is seen an alternative embodiment, designated in its entirety by the numeral 88, of a third lens system adapted for use in the lens selector 75. This lens system 88 utilizes a single lens element 89 which has integrally formed therewith a radially outwardly extending shoulder 90 which is generally square-shaped in cross section and which is dimensioned so as to be slidably engageable within the slot 82 with the lens element 89 coaxially mounted in the housing 76 relative to the first lens 77 and the second lens 78. The shoulder 91 protrudes through the housing 76 wall. When the third lens system 88 is positioned in the housing 76, a knob 91 (which can be formed of molded plastic) is fitted over such. Knob 91 has formed on its underside a hole adapted to nest over and about upper portions of the shoulder 90. In addition, the knob 91 has extending integrally therefrom on the bottom face thereof a pair of tabs 92 which are here each cross sectionally square in configuration, and which are each adapted to rest in adjacent relationship against a side edge portion of the lens element 89 and also to fit into the slot 82 when the knob 91 is fully engaged with the shoulder 90. A screw 93 centrally extends through an appropriately formed aperture in knob 91 and engages threadably a channel formed in the end of shoulder 90. Screw 93 thus secures the knob 91 to the shoulder 90 to complete assembly of the lens element 89. Opposed side portions of the knob 91 in the embodiment shown are generally concavely configured thereby to adapt the knob 91 for ready grasping between the thumb and forefinger of a user of the assembled lens selector 75, the flattened portions of the knob 91 generally being oriented so as to extend transversely across the side edge of the housing 76. Third lens systems 79 and 88 are thus adapted, in effect, to be suspended from side wall portions of the housing 76 on either side adjacent to the slot 82. The three other sides of such a third lens system 79 or 88 besides that having the integral shoulder are each being adjacent to but spaced from the respective, adjacent interior wall portions of the housing 76 during sliding movements thereof, thereby eliminating any tendency to cock.

In summary, and as those skilled in the art will appreciate from the preceding description, the present lens selector employs characteristically an elongated opaque housing which has an axis and a generally cross sectionally rectangular configuration. Fixed coaxially in this housing in spaced relationship to one end thereof is a converging meniscus lens means, including mounting means therefor. Fixed coaxially in the housing adjacent the opposite end thereof is a plano convex lens means, including mounting means therefor.

The plano convex lens means generally conforms in its perimeter contour approximately with the interior cross section of the housing. Also, the plano convex lens means approaches the interior cross section of the housing in its length and width dimensions. The housing also has a generally constant interior cross section between the conveging meniscus lens means and the plano convex lens means. A longitudinally extending slot is defined in the housing between the converging meniscus lens means and the plano convex lens means.

A biconcave lens means comprised of a clear plastic and coaxially located in the housing between the converging meniscus lens means and the plano lens means is provided. This biconcave lens means generally conforms in its perimeter contour approximately with the constant interior cross section of the housing. Also, this biconcave lens means approaches the constant interior cross section in its length and width dimensions. This biconcave lens means is adapted for longitudinal sliding movements coaxially in the housing, preferably with most of its perimeter contour being maintained in a spaced adjacent relationship to adjacent interior walls of the housing.

Handle means is provided which is located adjacent the slot and which is accessible exteriorly relative to the housing for so slidably moving the biconcave lens means. First rail means which is fixed to a first perimeter portion of the biconcave lens means and which is also fixed to the handle means is provided, together with mounting means therefor. This first rail means extends transversely through the slot and is slidably engageable with longitudinal edge portions of the slot for guidance of the biconcave lens means during longitudinal sliding movements thereof.

There is also provided in a lens selector of this invention a second rail means which is associated with at least a second perimeter portion of the biconcave lens means and is slidably engageable with portions of the housing. This second rail means cooperates with the first rail means to stabilize the biconcave lens means during the longitudinal sliding movement thereof.

The converging meniscus lens means, the plano convex lens means, and the biconcave lens means coact together so that, as the bioconcave lens means is so slidably moved longitudinally in the housing a focused image is substantially continuously visible adjacent the end of the housing adjacent the converging meniscus lens means over a range of focal lengths extending from wide angle to telephoto.

In one preferred mode, a lens selector of the present invention has a pair of longitudinally extending slots defined in the housing in opposed generally parallel relationship to one another. Through a second one of the slots a second handle means connects with the second rail means.

In another mode, the lens selector of the present invention has second rail means located adjacent the first rail means, one on each opposed side thereof. Here, the second rail means is slidably engageable with adjacent interior wall surfaces of the housing.

Other and further modes and embodiments of the present invention will be apparent to those skilled in the art from a reading of the specification taken together with the drawings without departing from the spirit and scope thereof.

I claim:
1. A lens selector comprising
   A. an elongated opaque housing having
      1. an axis,
      2. a generally cross-sectionally rectangular configuration,
   B. a converging meniscus lens means fixed coaxially in said housing in spaced relationship to one end thereof, including mounting means therefor,
   C. a plano-convex lens means fixed coaxially in said housing adjacent the opposite end thereof, including mounting means therefor, said plano convex lens means generally conforming in its perimeter contour approximately with the interior cross section of said housing and also approaching said interior cross section in its length and width dimensions,

D. said housing further having
1. a generally constant interior cross section between said converging meniscus lens means and said plano convex lens means, and
2. a longitudinally extending slot defined therein between said converging meniscus lens means and said plano convex lens means, E. a biconcave lens means comprised of a clear plastic and coaxially located in said housing between said converging meniscus lens means and said plano convex lens means said biconcave lens means generally conforming in its perimeter contour approximately with said constant interior cross section and also approaching said constant interior cross section in its length and width dimensions, said biconcave lens means being adapted for longitudinal sliding movements coaxially in said housing, F. handle means located adjacent said slot and accessable exteriorly relative to said housing for so slidably moving said biconcave lens means, G. first rail means fixed to a first perimeter portion of said biconcave lens means and also fixed to said handle means extending transversely through said slot and being slidably engagable with longitudinal edge portions of said slot for guidance of said biconcave lens means during said longitudinal sliding movements thereof, H. second rail associated with at least a second perimeter portion of said biconcave lens means and slidably engagable with portions of said housing, said second rail means cooperating with said first rail means to stabilize said biconcave lens means during said longitudinal sliding movements thereof, I. said converging meniscus lens means said plano convex lens means and said biconcave lens means coacting together so that, as said biconcave lens means is so slidably moved, a focused image is substantially continuously visible adjacent said one end over a range of focal lengths extending at least about 10:1 focal length from wide angle to telephoto positions.

2. The lens selector of claim 1 further including cooperating indicator means on said handle means and on the outside of said housing adjacent said slot for identification of focal lengths determined by the positions of said biconcave lens.

3. The lens selector of claim 1 wherein said housing, said lenses, said handle means and said rails are comprised of plastic.

4. The lens selector of claim 1 wherein:
A. a second longitudinally extending slot is defined in said housing in opposed generally parallel relationship to said first slot,
B. a second handle means is located adjacent said second slot and is accessable exteriorly relative to said housing for so slidably moving said biconcave lens means and
C. said second rail means is further fixed to said second handle means including mounting means therefor, said second rail means extending transversely through said slot and being slidably engagable with longitudinal edge portions of said second slot for guidance of said biconcave lens during said longitudinal sliding movements thereof.

5. The lens selector of claim 1 wherein said second rail means is located adjacent said first rail means one on each opposed side thereof and said second rail means is slidably engagable with adjacent interior wall surfaces of said housing.

6. The lens selector of claim 1 wherein said biconcave lens means, said handle means, and said first and second rail means are integral and comprise a single piece of molded plastic.

7. The lens selector of claim 1 wherein said biconcave lens means utilizes a single biconcave lens element.

8. The lens selector of claim 1 wherein said biconcave lens means utilizes a pair of coaxial biconcave lens elements.

9. The lens selector of claim 1 wherein said first rail means is comprised of a plastic different from that comprising said biconcave lens means.

10. The lens selector of claim 1 wherein said first rail means and said second rail means are integral with said biconcave lens means in one piece of molded plastic and said handle means is initially comprised of another piece of molded plastic.

11. The lens selector of claim 1 wherein most of the perimeter portions of said biconcave lens means are maintained in spaced relationship to adjacent interior wall surfaces of said housing.

* * * * *

UNITED STATES PATENT AND TRADEMARK OFFICE
CERTIFICATE OF CORRECTION

PATENT NO. : 3,981,564
DATED : September 21, 1976
INVENTOR(S) : Gerald Hoos

It is certified that error appears in the above–identified patent and that said Letters Patent are hereby corrected as shown below:

Please correct: Claim 1, part G, in line 24 after "handle means" insert the following "including mounting means therefore, said first rail means".

Signed and Sealed this

Twenty-fourth Day of May 1977

[SEAL]

Attest:

RUTH C. MASON
*Attesting Officer*

C. MARSHALL DANN
*Commissioner of Patents and Trademarks*